United States Patent
Lowen et al.

(10) Patent No.: US 7,017,077 B2
(45) Date of Patent: Mar. 21, 2006

(54) SYSTEM AND METHOD OF ERROR RETENTION FOR THREADED SOFTWARE

(75) Inventors: Daniel S. Lowen, Arlington, MA (US); Clifford O. Hayden, Needham, MA (US)

(73) Assignee: International Business Machines Corporation, Armonk, NY (US)

(*) Notice: Subject to any disclaimer, the term of this patent is extended or adjusted under 35 U.S.C. 154(b) by 589 days.

(21) Appl. No.: 10/042,503

(22) Filed: Jan. 9, 2002

(65) Prior Publication Data
US 2003/0131282 A1 Jul. 10, 2003

(51) Int. Cl.
*G06F 11/00* (2006.01)
(52) U.S. Cl. ............................... 714/20; 714/15
(58) Field of Classification Search ............... 714/20, 714/15, 38; 717/101, 124, 127, 128
See application file for complete search history.

(56) References Cited

U.S. PATENT DOCUMENTS

| 5,884,022 A * | 3/1999 | Callsen et al. ............. 714/22 |
|---|---|---|
| 5,913,041 A | 6/1999 | Ramanathan et al. |
| 6,012,066 A | 1/2000 | Discount et al. |
| 6,044,398 A | 3/2000 | Marullo et al. |
| 6,076,166 A | 6/2000 | Moshfeghi et al. |
| 6,138,149 A | 10/2000 | Ohmura |
| 6,175,838 B1 | 1/2001 | Papierniak et al. |
| 6,192,382 B1 | 2/2001 | Lafer et al. |
| 6,389,426 B1 * | 5/2002 | Turnbull et al. ............. 707/102 |
| 6,457,142 B1 * | 9/2002 | Klemm et al. ............. 714/38 |
| 6,539,501 B1 * | 3/2003 | Edwards ............. 714/45 |
| 6,584,487 B1 * | 6/2003 | Saboff ............. 718/100 |
| 6,718,489 B1 * | 4/2004 | Lee et al. ............. 714/43 |
| 6,785,893 B1 * | 8/2004 | Morris et al. ............. 719/318 |
| 6,801,480 B1 * | 10/2004 | Ono ............. 369/30.17 |
| 6,957,366 B1 * | 10/2005 | McDonald ............. 714/38 |
| 2002/0034134 A1 * | 3/2002 | Hirashima ............. 369/44.28 |

* cited by examiner

*Primary Examiner*—Dieu-Minh Le
(74) *Attorney, Agent, or Firm*—Cardinal Law Group; David A. Mims, Jr.

(57) ABSTRACT

The invention provides a method for error detection of multi-threaded software. The method comprises executing an application which uses a logger that collects log statements, collecting at least one log statement from at least one application thread and storing the at least one log statement in memory, and allowing the collected log statement to be persisted in case of an error in a production environment.

18 Claims, 10 Drawing Sheets

SYSTEM AND METHOD OF ERROR RETENTION FOR THREADED SOFTWARE

FIELD OF THE INVENTION

In general, the invention relates to computer software. More specifically, the invention relates to increased error specification using a method of error retention for threaded production software.

BACKGROUND OF THE INVENTION

Defects in production application software that process a large volume of requests via frequently created short-lived threads, such as applications implemented on modern Web application servers, are notoriously difficult to correct.

Development teams that build application software typically implement a configurable logging facility that produces log statements that are persisted to a file, or to a database. These logging facilities usually allow various levels of logging. At debug levels, the typical logging facility produces a detailed log. At production levels, typically only a health check or detected error conditions are logged.

The statements captured in a debug level log are invaluable when diagnosing the cause of unexpected errors especially those caused by defects in the software itself. However, if production software were to log debug level statements, the resulting performance degradation caused by persisting the log would be prohibitive. As production software executes more threads, the multiple threads would exacerbate the performance degradation.

Thus, there is a significant need for a system and method for improving retention of error information (error logging) that overcomes the above disadvantages and shortcomings, as well as other disadvantages.

BRIEF SUMMARY OF THE INVENTION

One aspect of the invention provides a method for error detection of multi-threaded application software. The method may include providing application threads with access to a logger that collects a thread's log statements in memory and can persist all of those statements in case of an error in the production environment. The method may also include detecting a death of an application thread by the logger and deleting the application thread's log statements after thread death detection.

Another aspect of the invention provides a system for error detection of multi-threaded software. The system comprising a means for executing an application which uses a logger that collects log statements, means for collecting at least one log statement from at least one application thread and storing the at least one log statement in memory and means for allowing the collected log statement to be persisted in case of an error in a production environment. The system may also include means for detecting a death of an application thread by the logger and means for deleting the application thread's log statements after thread death detection.

Another aspect of the invention provides a computer readable medium storing a computer program. The computer readable medium comprising computer readable code for executing an application which uses a logger that collects log statements, computer readable code for collecting at least one log statement from at least one application thread and storing the at least one log statement in memory, and computer readable code for allowing the collected log statement to be persisted in case of an error in a production environment. The computer readable medium may include computer readable code for detecting a death of an application thread by the logger, and computer readable code for deleting the application thread's log statements after thread death detection.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
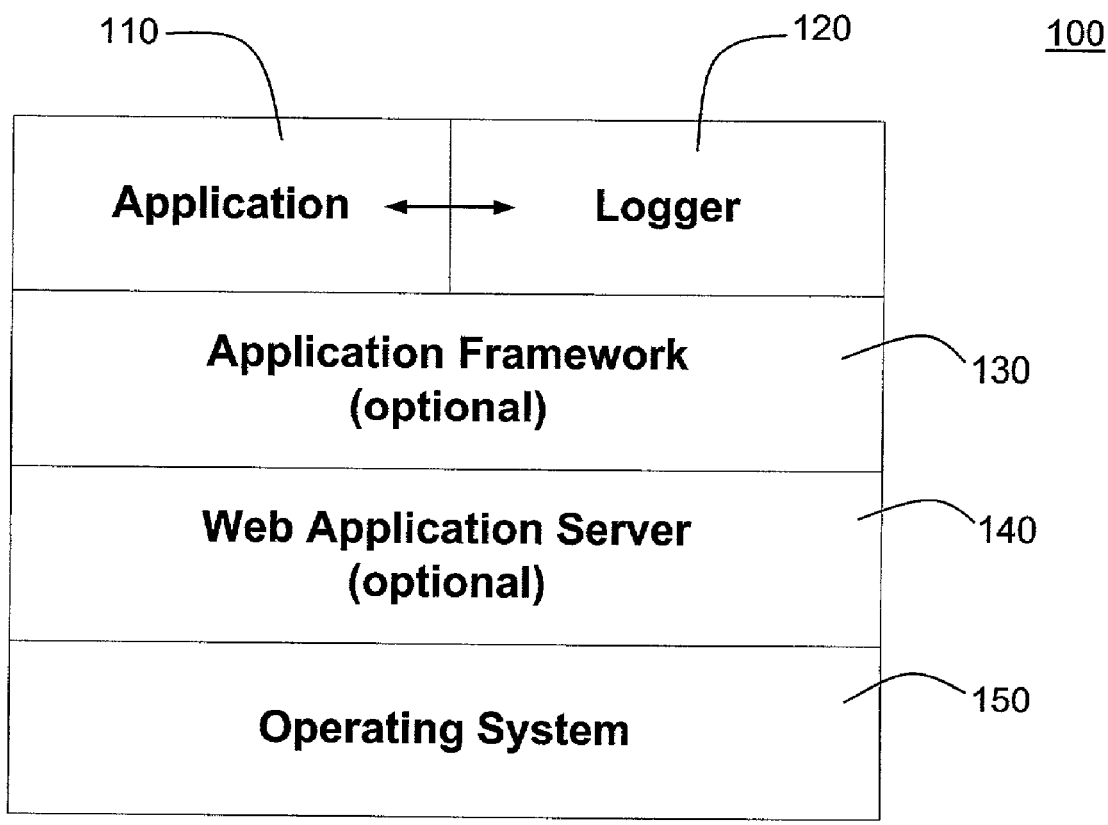
FIG. 1 is a block diagram illustrating one embodiment for a method of operation of an in-memory logger in accordance with the present invention.

FIG. 1 illustrates one embodiment for a method of operation of an in-memory logger 100 in accordance with the present invention. The illustrated embodiment of the invention demonstrates that a logger 120 may reside on an operating system 150, and an additional embodiment may provide the operating system 150 to reside on a Web Application Server 140. The logger 120 may respond to a request from threads of execution operating as part of a software application 110. One embodiment of the invention may depict the interacting software application 110 as a Web application. Additionally, FIG. 1 illustrates an embodiment of the invention where the logger 120 may be integrated into the base class of an application framework 130 thus easing the applications' 110 access to the logger.

Figure 2:
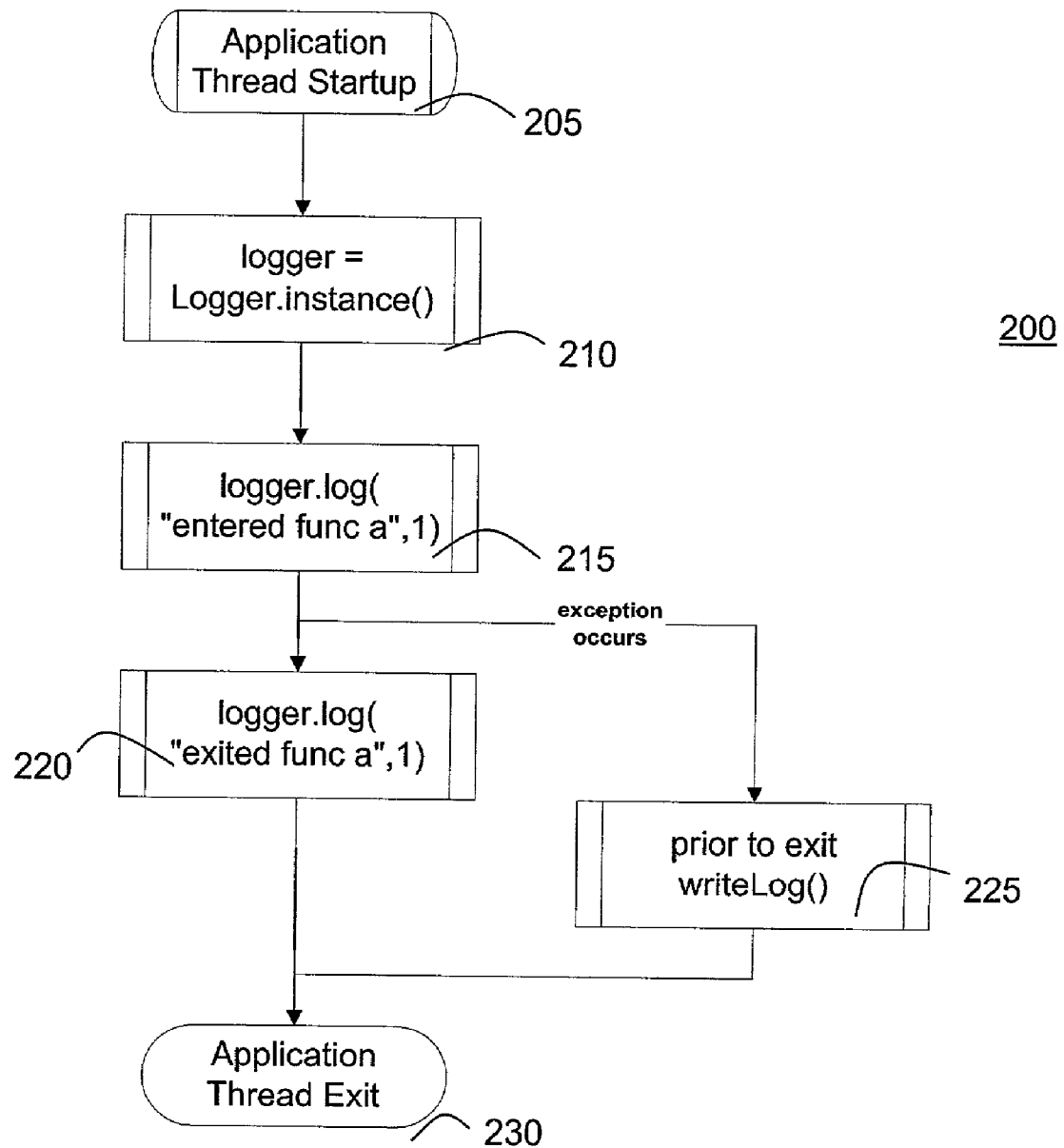
FIG. 2 is a flowchart representation of one embodiment for an application thread interaction with the in-memory logger of FIG. 1, in accordance with the present invention.

FIG. 2 illustrates, as a flowchart representation, one embodiment of how an application thread may interact with an embodiment of an in-memory logger (logger) compatible with the system of FIG. 1. An application (production software) may activate a thread 205. The application thread may obtain an instance of the logger 210. In one embodiment of the invention the logger may be a Singleton design pattern object. The logger can then receive data (log statements) from the application thread 215, 220. For one embodiment of the invention, the application thread can indicate to the logger the log statement's retention level 215, 200. If the application thread detects an error, the application thread can call the logger's write log method to direct the logger to persist all log statements the logger received from the application thread 225. One embodiment of the invention may place each log statement into a log message queue, store the log statements in memory, and may write the log statements to a persistence mechanism as is known in the art. After the production software's application thread termination, the logger will detect the thread's death and discard the log statements stored in memory 230.

Figure 3:
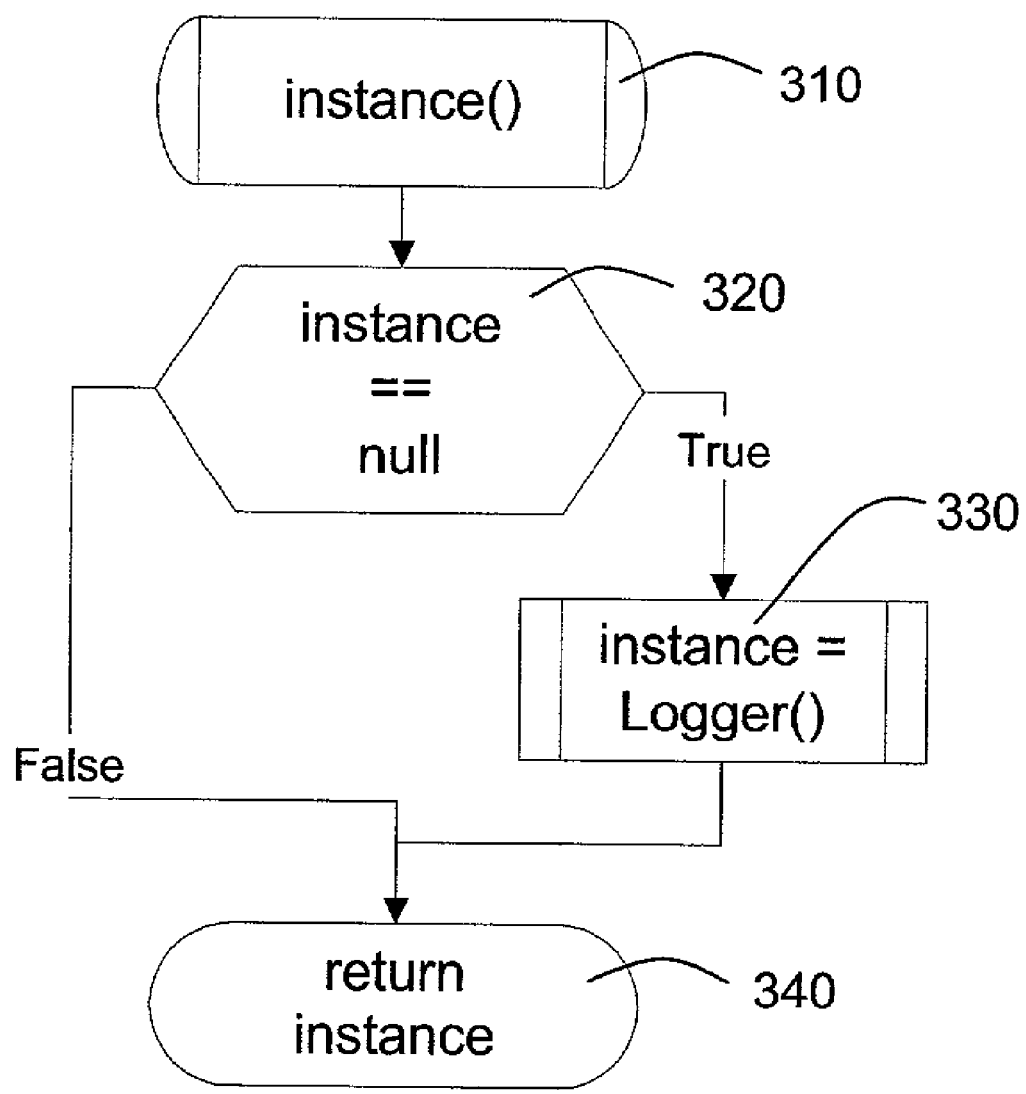
FIG. 3 is a flowchart representation of a preferred embodiment for an instance method used by the application thread of FIG. 2, in accordance with the present invention.

Illustrated in FIG. 3, is an embodiment of the logger as a Singleton design pattern object 300. When an instance of the logger is requested 310, the logger's static instance method may inquire a static variable indicating whether an instance of the logger has already been constructed 320. If the logger has not yet been constructed then the instance method will construct a new logger object 330. Upon exit of the instance method, the single instance of the logger object is returned 340.

Figure 4:
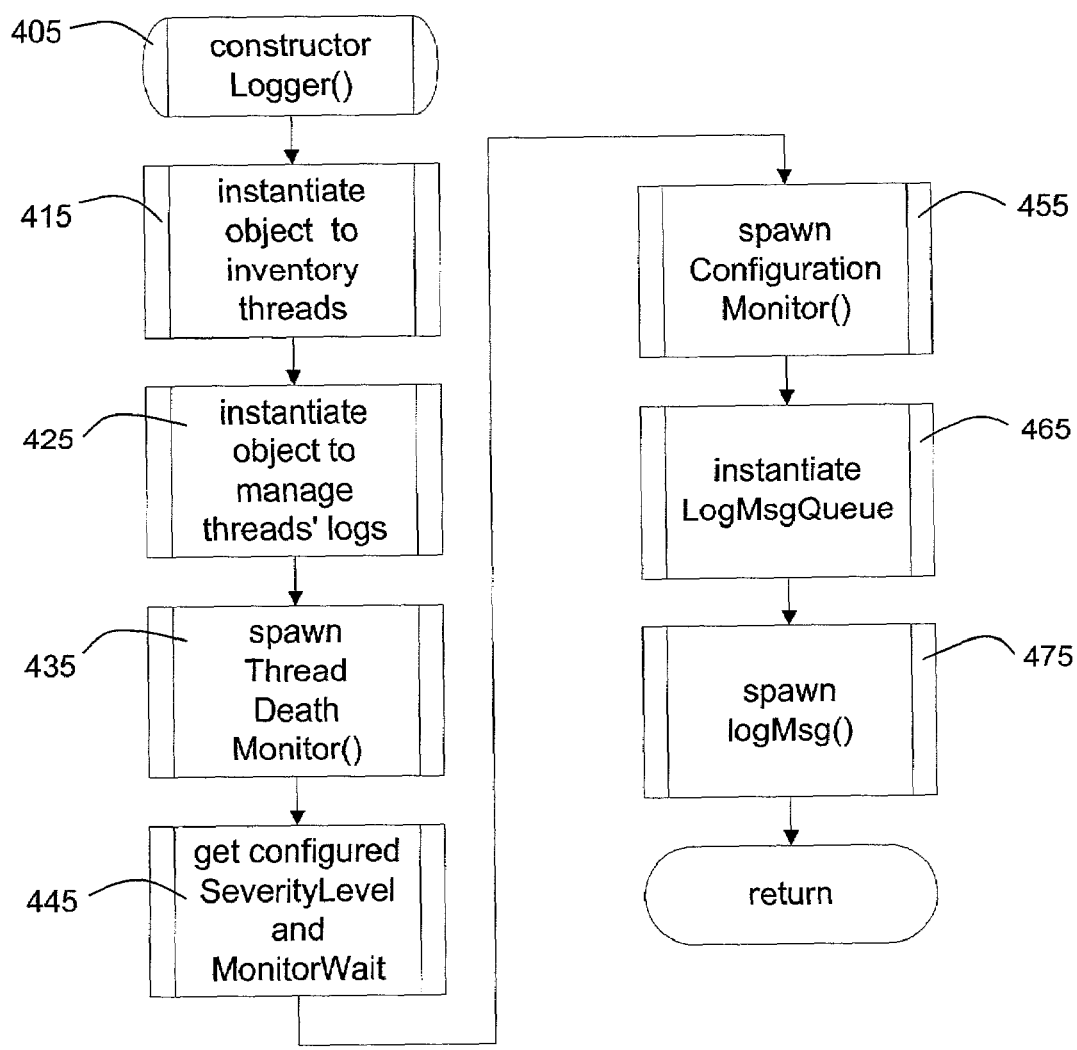
FIG. 4 is a flowchart representation of a preferred embodiment for a constructor of a logger object as associated with the instance method of FIG. 3, in accordance with the present invention.

FIG. 4 illustrates a flowchart representation of a logger object's constructor 400 associated with the logger's instance method 300 of FIG. 3. When activated 405, the logger object constructor 400 may begin by instantiating an object to inventory the threads 415. In addition, the logger object constructor 400 may instantiate an object to manage any accumulated application threads' log statements 425. A thread death monitor may be activated 435 to monitor application threads' operational status. The minimum retention level of qualifying log statements and a predetermined waiting period for monitoring function control is retrieved 445 by the logger object constructor 400 for use with the activation of a configuration monitor 455. The logger object constructor 400 may continue by instantiating a log message queue 465 and complete operation by activating a log message thread to monitor the log message queue 475.

Figure 5:
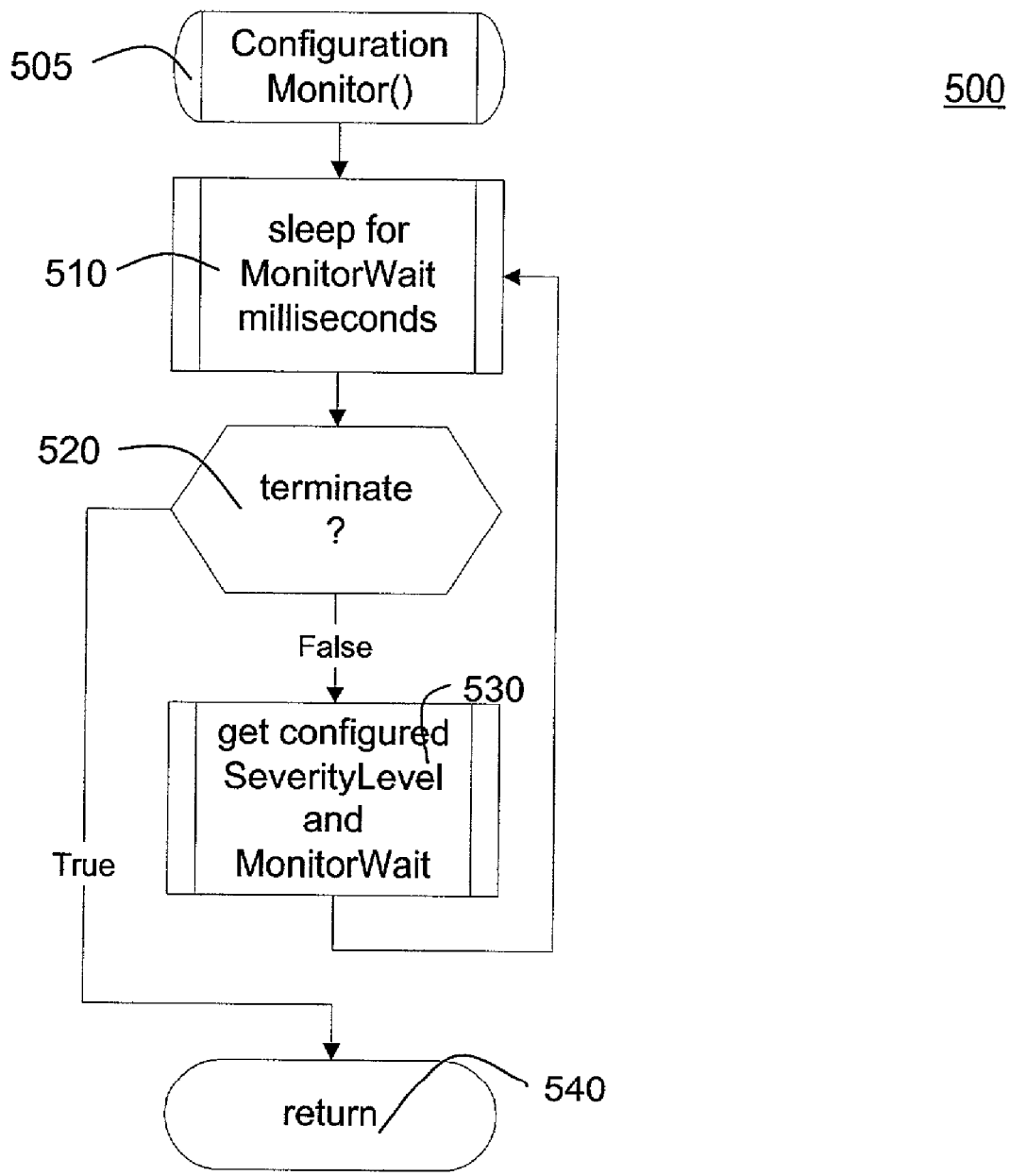
FIG. 5 is a flowchart representation of a preferred embodiment for a configuration monitor as associated with the logger object of FIG. 4, in accordance with the present invention.

One embodiment of the configuration monitor associated with the logger object constructor 400 of FIG. 4 is illustrated as a flowchart in FIG. 5. After its activation 505, the configuration monitor 500 may suspend operation 510 for a duration of time (waiting period) defined in the logger object constructor 400 of FIG. 4. After the waiting period has lapsed, the configuration monitor 500 looks for a termination indicator. If a termination indicator is found then the configuration monitor may exit 540. If a termination indicator is not found then the configuration monitor may re-obtain the minimum retention level of qualifying log statements and a predetermined waiting period for monitoring function and configuration data 530 and may again suspend operation 510.

Figure 6:
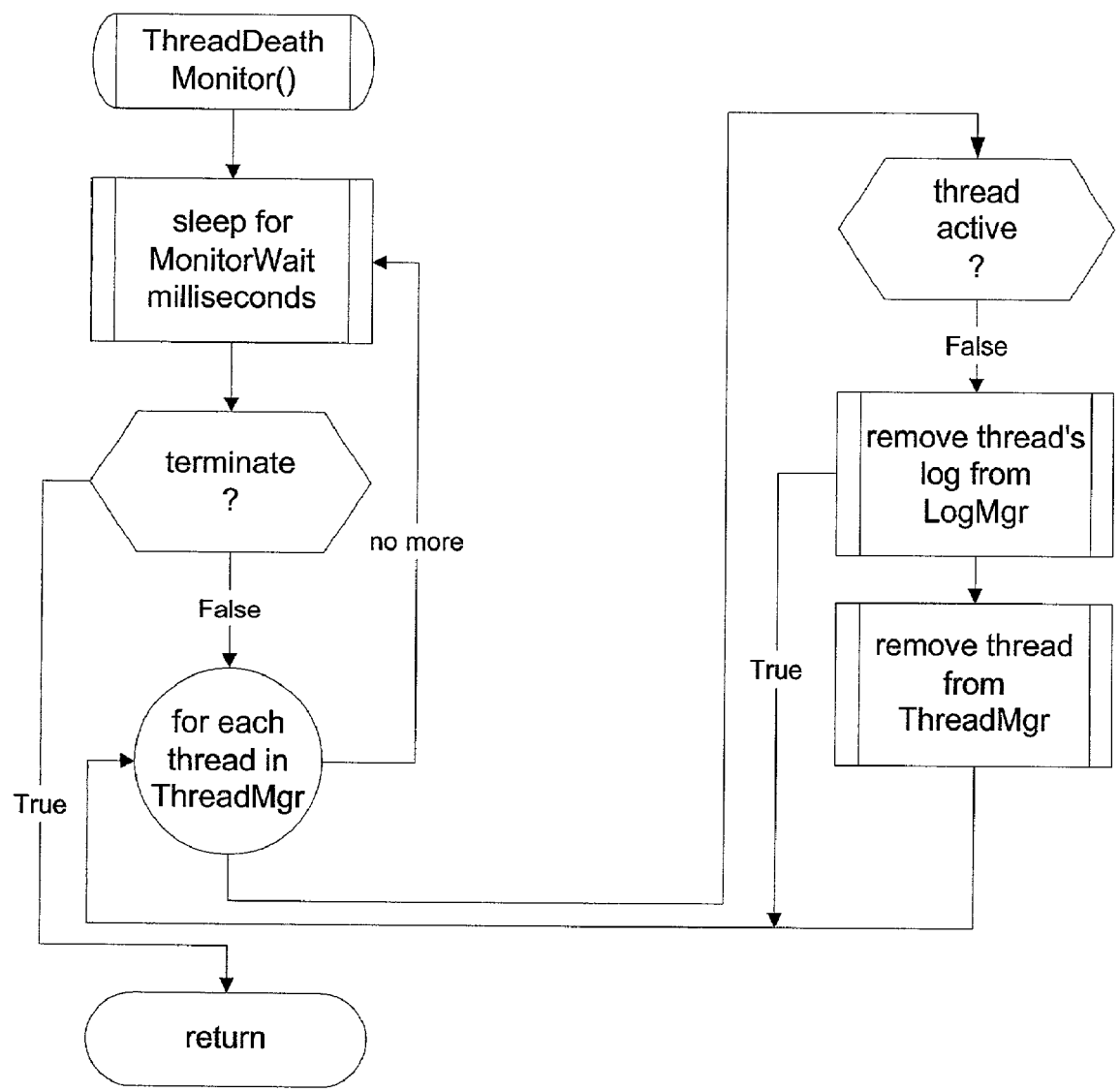
FIG. 6 is a flowchart representation of a preferred embodiment for a thread death monitor as associated with the logger object of FIG. 4, in accordance with the present invention.

One embodiment of the thread death monitor associated with the logger object constructor 400 of FIG. 4 is illustrated as a flowchart in FIG. 6. After its activation 605, the thread death monitor 600 suspends operation 610 for the duration of time defined in the logger object constructor 400 of FIG. 4 or redefined in the configuration monitor 500 of FIG. 5. After the waiting period has lapsed, the thread death monitor 600 looks for a termination indicator 615. If a termination indicator is found then the configuration monitor may exit 640. Otherwise, for each application thread that requested an instance of the logger 620, the thread death monitor 600 obtains the application thread's state of operation 625. If an application thread is found to be inactive, the thread death monitor 600 may remove the application thread's log from the log manager 630 and may remove the application thread from the thread manager 635. After processing each application thread entry in the thread manager 620, the thread death monitor 600 may again suspend operation 610.

Figure 7:
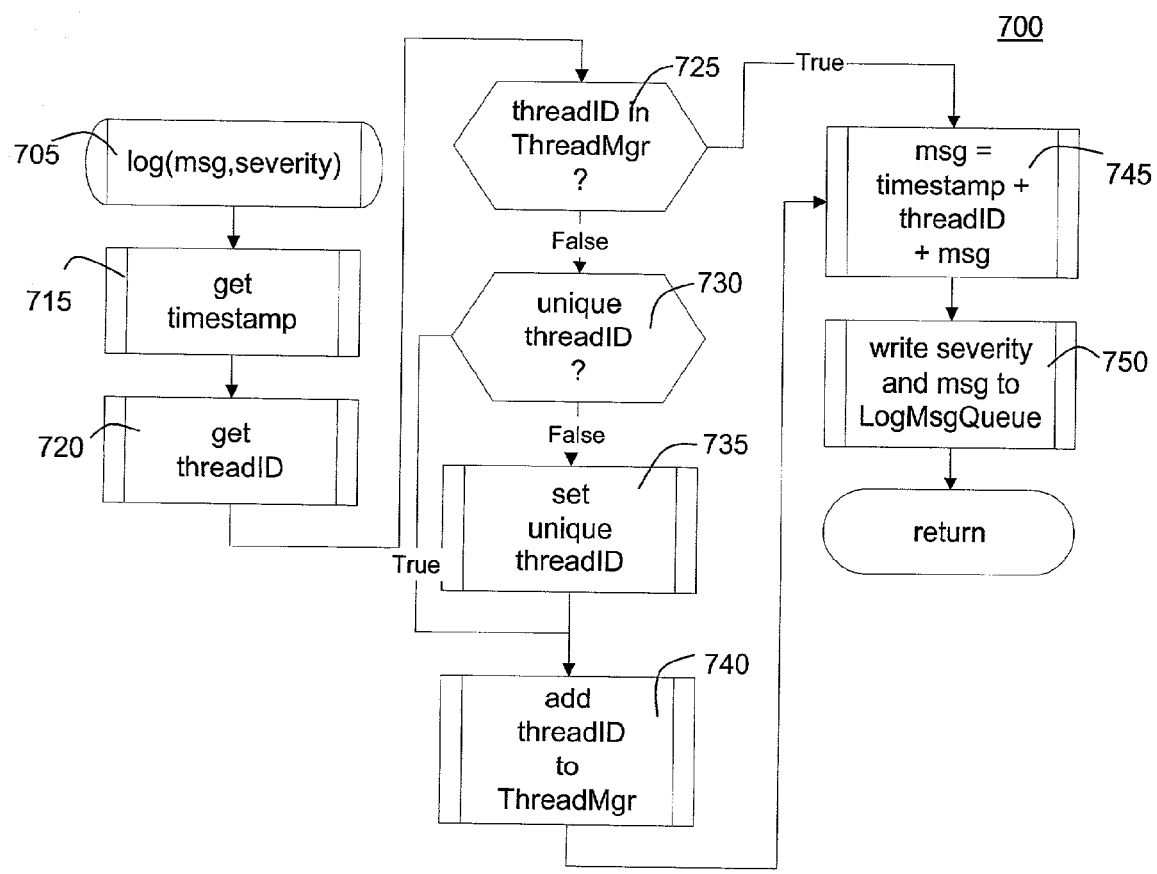
FIG. 7 is a flowchart representation of a preferred embodiment for a log message thread, as associated with the logger object of FIG. 4, in accordance with the present invention.

FIG. 7 illustrates, as a flowchart, the operations of the logger's log method 700 that is exposed to application threads to allow application threads to pass a log statement to the logger. Activation of the log method 700 occurs when an application thread submits a log statement to the logger along with the log statement's retention level 705. The log method 700 may then obtain a time stamp 715. The log method 700 may continue and obtain the requesting application thread's identification 720. The application thread's identification data is compared to thread identification data in the thread manager 725.

If the application thread's identification is not found in the thread manager, the log method 730 may check if application thread's identification is unique. If the application thread's identification is not unique then the log method 700 may assign unique thread identification 735 to the application thread. Once the unique thread identification has been assigned, the application thread's unique thread identification may be added to the thread manager 740.

Once the application thread's identification is in the thread manager, the log method 700 may combine the timestamp, the application thread's identification, and log statement as a new log message 745. The log method 700 may then write the new log message along with its retention level to the log message queue 750, which ends the log method 700 operation.

Figure 8:
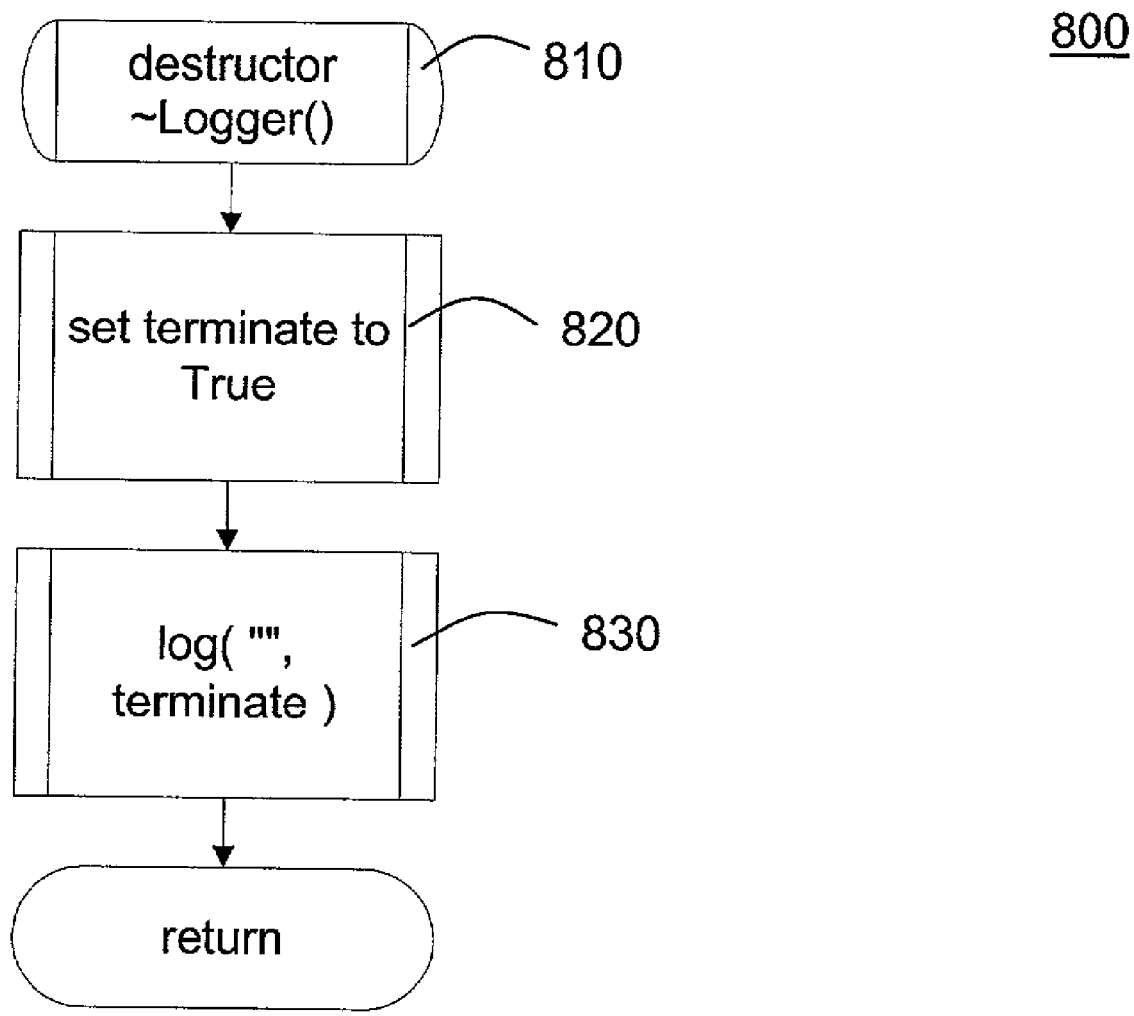
FIG. 8 is a flowchart representation of a preferred embodiment for the destructor of the logger object of FIG. 4, in accordance with the present invention.

FIG. 8 illustrates a flowchart representation of a logger object destructor 800. When activated 810, the logger object destructor 800 may begin by setting a termination indicator to true 820 which may cause the configuration monitor 500 and the thread death monitor 600 to terminate. The logger object destructor may then use the log method to pass a log statement to background log message thread indicating that it too should terminate 830 which ends the logger object destructor 800 operation.

Figure 9:
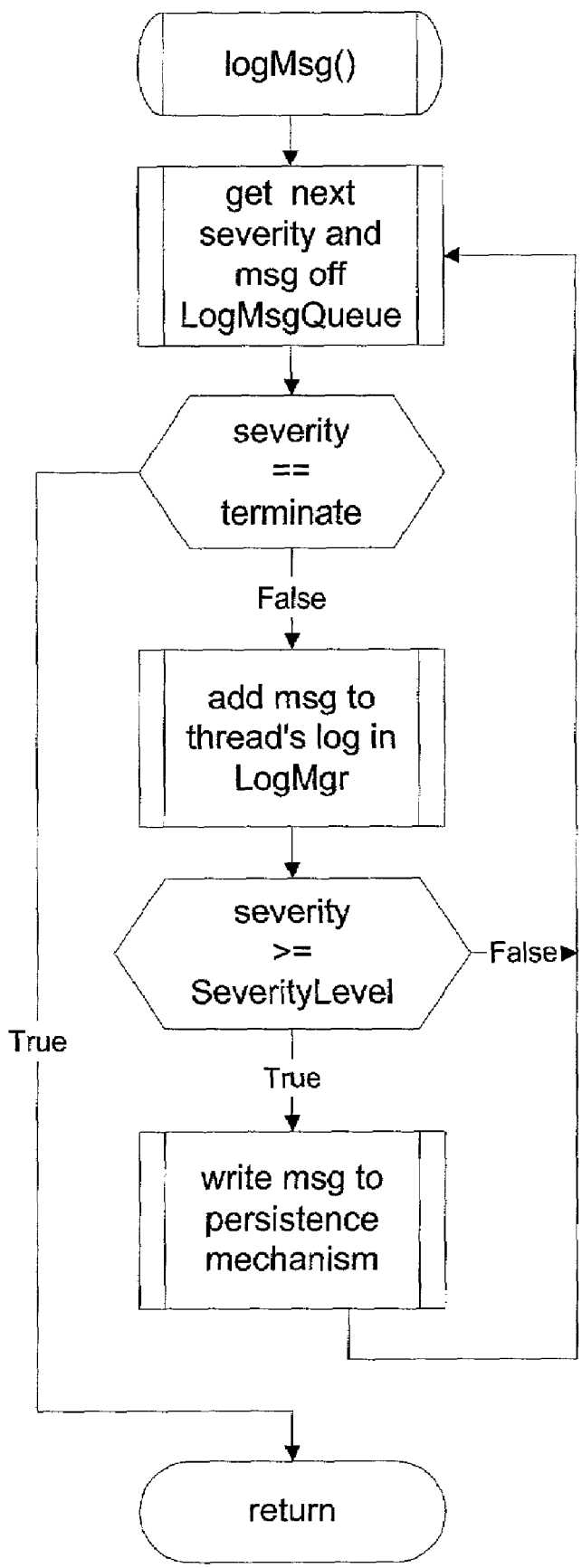
FIG. 9 is a flowchart representation of a preferred embodiment for a log message thread, as associated with the logger object of FIG. 4, in accordance with the present invention.

FIG. 9 illustrates one embodiment of a log message thread 900 associated with the logger object constructor 400 of FIG. 4. The log message thread processes messages placed on the logger's log message queue. Subsequent to activation 910, the log message thread may repeatedly obtain and process messages arriving on the log message queue 920. For each arriving message, the log message thread may dequeue the log message and its retention level from the log message queue 920. If the retention level has been set to equal terminate 930, the log message thread 900 may terminate 970. Otherwise, the error message may be added to the application thread's log in the log manager 940. If the log message's retention level is greater then or equal to the minimum retention level defined in the logger object constructor 400 of FIG. 4 or redefined in the configuration monitor 500 of FIG. 5, the log message thread may write the log message to the persistence mechanism 960. After the message has been written 960, or if the retention level is less than the minimum retention level 950, the log message thread 900 may return to obtain process another log message from the log message queue 920. This process may continue until the retention level has been set to equal terminate 930, and the log message thread 900 terminates 970.

Figure 10:
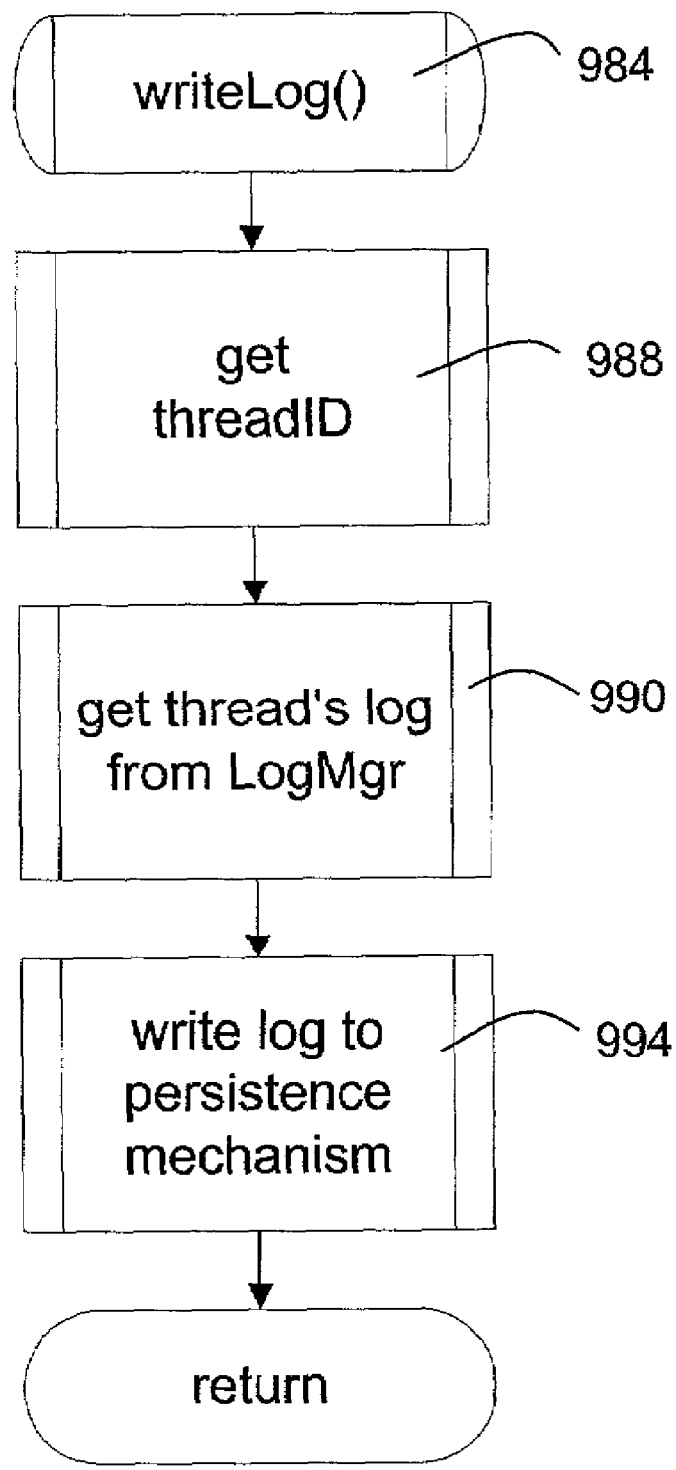
FIG. 10 is a flowchart representation of a preferred embodiment for a write log method, used by the application thread of FIG. 2, in accordance with the present invention.

The logger's write log method 984, illustrated in FIG. 10 as a flowchart and associated with FIG. 1, writes the requesting application thread's log statements to the persistence mechanism. The method may begin 984 by obtaining the requesting application thread's identification 988. The write log method 984 may retrieve the requesting application thread's log statements from the log manager 990. The write log method 984 may then be written to the retrieved log statements to the persistence mechanism 994, which then ends the write log method 984 operation.

The above-described methods and implementation of error retention for threaded production software are example methods and implementations. These methods and implementations illustrate one possible approach for error retention for threaded production software. The actual implementation may vary from the method discussed. Moreover, various other improvements and modifications to this invention may occur to those skilled in the art, and those improvements and modifications will fall within the scope of this invention as set forth below.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of error retention for multi-threaded software, comprising:

executing an application which uses a logger that collects log statements;

collecting at least one log statement, the log statement including a retention level indicator, from at least one application thread and storing the at least one log statement in memory; and allowing the collected log statement to be persisted in case of an error in a production environment, wherein allowing the collected log statement to be persisted in case of an error in a production environment comprises persisting the collected log statement if the retention level of the collected log message is greater than or equal to a minimum retention level.

2. The method of claim 1 wherein the application and logger are implemented on a web application server.

3. The method of claim 1 wherein the executing application is run in a development environment.

4. The method of claim 1 wherein the executing application is run in a test environment.

5. The method of claim 1 wherein the logger is built into a base class of an object oriented application framework.

6. The method of claim 1 wherein the production application is an Internet accessible application.

7. The method of claim 1 wherein the method can be implemented using background threads.

8. The method of claim 1 further comprising:

detecting a death of an application thread by the logger; and deleting the application thread's log statements after thread death detection.

9. A system of error retention for multi-threaded software, comprising:

means for executing an application which uses a logger that collects log statements;

means for collecting at least one log statement, the log statement including a retention level indicator, from at least one application thread and storing the at least one log statement in memory; and means for allowing the collected log statement to be persisted in case of an error in a production environment, wherein means for allowing the collected log statement to be persisted in case of an error in a production environment comprises means for persisting the collected log statement if the retention level of the collected log message is greater than or equal to a minimum retention level.

10. The system of claim 9 further comprising:

means for detecting a death of an application thread by the logger; and means for deleting the application thread's log statements after thread death detection.

11. A computer readable medium storing a computer program comprising:

computer readable code for executing an application which uses a logger that collects log statements;

computer readable code for collecting at least one log statement, the log statement including a retention level indicator, from at least one application thread and storing the at least one log statement in memory; and computer readable code for allowing the collected log statement to be persisted in case of an error in a production environment, wherein computer readable code for allowing the collected log statement to be persisted in case of an error in a production environment comprises computer readable code for persisting the collected log statement if the retention level of the collected log message is greater than or equal to a minimum retention level.

12. The computer readable medium of claim 11 wherein the application and logger are implemented on a web application server.

13. The computer readable medium of claim 11 wherein the executing application is run in a development environment.

14. The computer readable medium of claim 11 wherein the executing application is run in a test environment.

15. The computer readable medium of claim 11 wherein the logger is built into a base class of an object oriented application framework.

16. The computer readable medium of claim 11 wherein the production application is an Internet accessible application.

17. The computer readable medium of claim 11 wherein the method can be implemented using background threads.

18. The computer readable medium of claim 11 further comprising:

computer readable code for detecting a death of an application thread by the logger; and computer readable code for deleting the application thread's log statements after thread death detection.

* * * * *